US010226992B2

(12) United States Patent
Venturi

(10) Patent No.: US 10,226,992 B2
(45) Date of Patent: Mar. 12, 2019

(54) POWER TRAIN FOR DRIVING A MOTOR VEHICLE WITH A VARIABLE-SPEED TRANSMISSION DEVICE HAVING A TRIPLE PLANETARY GEAR SET AND ESPECIALLY A POWER TRAIN FOR A HYBRID-TYPE VEHICLE

(71) Applicant: IFP Energies nouvelles, Rueil-Malmaison (FR)

(72) Inventor: Stephane Venturi, Roiffieux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 74 days.

(21) Appl. No.: 15/534,949

(22) PCT Filed: Dec. 1, 2015

(86) PCT No.: PCT/EP2015/078195
§ 371 (c)(1),
(2) Date: Jun. 9, 2017

(87) PCT Pub. No.: WO2016/091656
PCT Pub. Date: Jun. 16, 2016

(65) Prior Publication Data
US 2018/0222306 A1    Aug. 9, 2018

(30) Foreign Application Priority Data

Dec. 12, 2014  (FR) ...................................... 14 62325

(51) Int. Cl.
*F16H 3/66* (2006.01)
*B60K 6/365* (2007.10)
(Continued)

(52) U.S. Cl.
CPC .............. *B60K 6/365* (2013.01); *B60K 6/383* (2013.01); *B60K 6/387* (2013.01); *B60K 6/48* (2013.01);
(Continued)

(58) Field of Classification Search
None
See application file for complete search history.

(56) References Cited

U.S. PATENT DOCUMENTS 8,185,284 B2 * 5/2012 Iwase ...................... F16D 48/06
701/51
8,894,528 B2 * 11/2014 Venturi .................. B60K 6/365
475/8
(Continued)

FOREIGN PATENT DOCUMENTS

DE    10 2007 014150 A1    9/2008
EP        0716947 A2    6/1996
(Continued)

OTHER PUBLICATIONS

International Search Report for PCT/EP2015/078195 dated Feb. 15, 2016; English translation submitted herewith (6 pages).

*Primary Examiner* — Dirk Wright
(74) *Attorney, Agent, or Firm* — Fitch, Even, Tabin & Flannery LLP

(57) ABSTRACT

A powertrain for an automotive vehicle comprising a thermal engine (10), a speed variation device (14) including an engine epicyclic gear train (26) with a sun gear (36) and a crown (48) which are each connected to shaft (12) of the thermal engine by a controlled coupling (28, 30) and to a fixed part (46) of the vehicle by a one-way automatic coupling (32, 34). A machine epicyclic gear train (90) is arranged on a machine shaft (92) substantially parallel to engine shaft (12) and connects the epicyclic gear train to a track for motion transmission to a drive axle. The machine
(Continued)

epicyclic gear train comprises a sun gear (94) carried by a sun gear shaft (100), a crown (126) and a planet gear carrier (108). A speed variation device (14) comprises an additional epicyclic gear train (138) and an engine toothed wheel (168) carried by the shaft (12) and connects the shaft to a machine toothed wheel carried by additional epicyclic gear train.

24 Claims, 7 Drawing Sheets

(51) Int. Cl.
    *B60K 6/383* (2007.10)
    *B60K 6/387* (2007.10)
    *B60K 6/48* (2007.10)
    *F16H 3/72* (2006.01)
    *F16H 3/44* (2006.01)

(52) U.S. Cl.
    CPC ............... *F16H 3/66* (2013.01); *F16H 3/725* (2013.01); *F16H 2003/445* (2013.01); *F16H 2200/201* (2013.01); *F16H 2200/2084* (2013.01); *F16H 2200/2087* (2013.01); *Y02T 10/6221* (2013.01)

(56) References Cited

U.S. PATENT DOCUMENTS

| | | | | |
|---|---|---|---|---|
| 9,162,578 | B2 * | 10/2015 | Venturi | B60K 6/383 |
| 2010/0029433 | A1 | 2/2010 | Tenberge | |
| 2011/0172044 | A1 | 7/2011 | Venturi | |
| 2016/0311309 | A1 * | 10/2016 | Venturi | B60K 6/365 |
| 2018/0001756 | A1 * | 1/2018 | Venturi | B60K 6/365 |
| 2018/0022205 | A1 * | 1/2018 | Venturi | B60K 6/365 |
| | | | | 475/5 |
| 2018/0201115 | A1 * | 7/2018 | Venturi | B60K 6/365 |
| 2018/0264923 | A1 * | 9/2018 | Venturi | B60K 6/365 |

FOREIGN PATENT DOCUMENTS

| | | | | |
|---|---|---|---|---|
| FR | 2955165 | A1 | 7/2011 | |
| FR | 2962697 | A1 * | 1/2012 | B60K 6/365 |
| FR | 2962697 | A1 | 1/2012 | |

\* cited by examiner

POWER TRAIN FOR DRIVING A MOTOR VEHICLE WITH A VARIABLE-SPEED TRANSMISSION DEVICE HAVING A TRIPLE PLANETARY GEAR SET AND ESPECIALLY A POWER TRAIN FOR A HYBRID-TYPE VEHICLE

CROSS REFERENCE TO RELATED APPLICATIONS

Reference is made to International Application No. PCT/EP2015/078195 filed Dec. 1, 2015, and French Application No. 14/62.325 filed Dec. 12, 2014, which are incorporated herein by reference in their entirety.

BACKGROUND OF THE INVENTION

Field of the Invention

The present invention relates to a powertrain for an automotive vehicle with a variable-speed transmission device comprising a triple epicyclic gear train which in particular a powertrain for a hybrid type vehicle.

Description of the Prior Art

This type of vehicle comprises a powertrain that uses, alone or in combination, as a traction/propulsion drive, a thermal engine, generally of internal-combustion type, with a speed variation device and a driving and receiving machine, like a rotary electrical machine connected to an electrical source, such as one or more electrical accumulators or batteries. This combination allows optimizing the performance of this vehicle, by reducing the discharge of emissions to the atmosphere as well as the fuel consumption. Thus, when the vehicle is to be driven with a high torque over a wide speed range while limiting exhaust gas and noise generation, as in an urban site, the electrical machine is preferably used for driving this vehicle. The thermal engine is used for driving this vehicle for uses where a high driving power and a wide operating range are required.

As is already known from French patent application No. 2,955,165 filed by the applicant, the automotive vehicle powertrain comprises a thermal engine with a shaft connected to a variable-speed transmission device including an engine epicyclic gear train with a sun gear and a crown each connected to the thermal engine shaft by a controlled coupling and to a fixed part of the powertrain by a one-way automatic coupling, and a planet gear carrier transmitting the speed variation to the drive axle of the vehicle through a transmission track comprising the elements contained between the planet carrier shaft and the axle, which provide kinematic connection between the shaft and the axle.

In order to increase the speed variation capacity when the vehicle is driven on the electrical machine, the applicant has combined the variable-speed transmission device of the aforementioned document with another epicyclic gear train connecting the engine epicyclic gear train to the track for motion transmission to the drive axle of the vehicle, as described in French patent application No. 2,962,697 filed by the applicant. In this configuration, the transmission track also comprises all the elements contained between the planet carrier shaft of the other epicyclic gear train and the axle.

Although it performs adequately, the applicant has further improved this speed variation device by making it possible to increase the number of gear ratios by use of a variable-speed transmission device of simple and inexpensive design.

SUMMARY OF THE INVENTION

The present invention therefore relates to a powertrain for an automotive vehicle comprising a thermal engine, a speed variation device including an engine epicyclic gear train with a sun gear and a crown, which each are connected to the thermal engine shaft by a controlled coupling and to a fixed part of the vehicle by a one-way automatic coupling. A machine epicyclic gear train is arranged on a machine shaft substantially parallel to the engine shaft and connects the engine epicyclic gear train to a track for motion transmission to a drive axle. The machine epicyclic gear train comprises a sun gear carried by a sun gear shaft, a crown and a planet gear carrier. The speed variation device comprises an additional epicyclic gear train and an engine toothed wheel carried by the engine shaft and connecting this shaft to a machine toothed wheel carried by the additional epicyclic gear train.

The additional epicyclic gear train can be arranged on the machine shaft.

The crown of the machine epicyclic gear train can be connected to the planet gear carrier of the additional epicyclic gear train.

The planet gear carrier of the machine epicyclic gear train can be connected to the planet gear carrier of the additional epicyclic gear train.

The crown of the machine epicyclic gear train can be carried by the fixed part of the powertrain.

The engine toothed wheel can be mounted idle on the engine shaft and the shaft can carry a controlled coupling for connection between the shaft and the wheel.

The controlled coupling can comprise a disc clutch.

The engine toothed wheel can be fixedly mounted on the engine shaft.

The additional epicyclic gear train can comprise a sun gear carried by a tubular sun gear shaft and the machine toothed wheel can be fixedly mounted on the sun gear shaft.

The additional epicyclic gear train can comprise a sun gear carried by a tubular sun gear shaft, the machine toothed wheel can be mounted idle on the sun gear shaft and the shaft can carry a controlled coupling for connection between the shaft and the wheel.

The controlled coupling can cooperate with a bearing surface carried by the machine toothed wheel.

The controlled coupling can cooperate with a bearing surface carried by the machine toothed wheel or with a bearing surface carried by a fixed part of the powertrain.

The tubular sun gear shaft of the additional epicyclic gear train can carry a tubular sleeve connected to the fixed part of the vehicle by a one-way automatic coupling and the shaft can carry a controlled coupling for connection between the shaft and the sleeve.

The powertrain can comprise a driving and generator machine for importing at least motion to the vehicle.

The rotor of the machine can be connected to the sun gear shaft of the machine epicyclic gear train.

BRIEF DESCRIPTION OF THE DRAWINGS

Other features and advantages of the invention will be clear from reading the description hereafter, given by way of non limitative example, with reference to the accompanying figures wherein.

DETAILED DESCRIPTION

Figure 1:
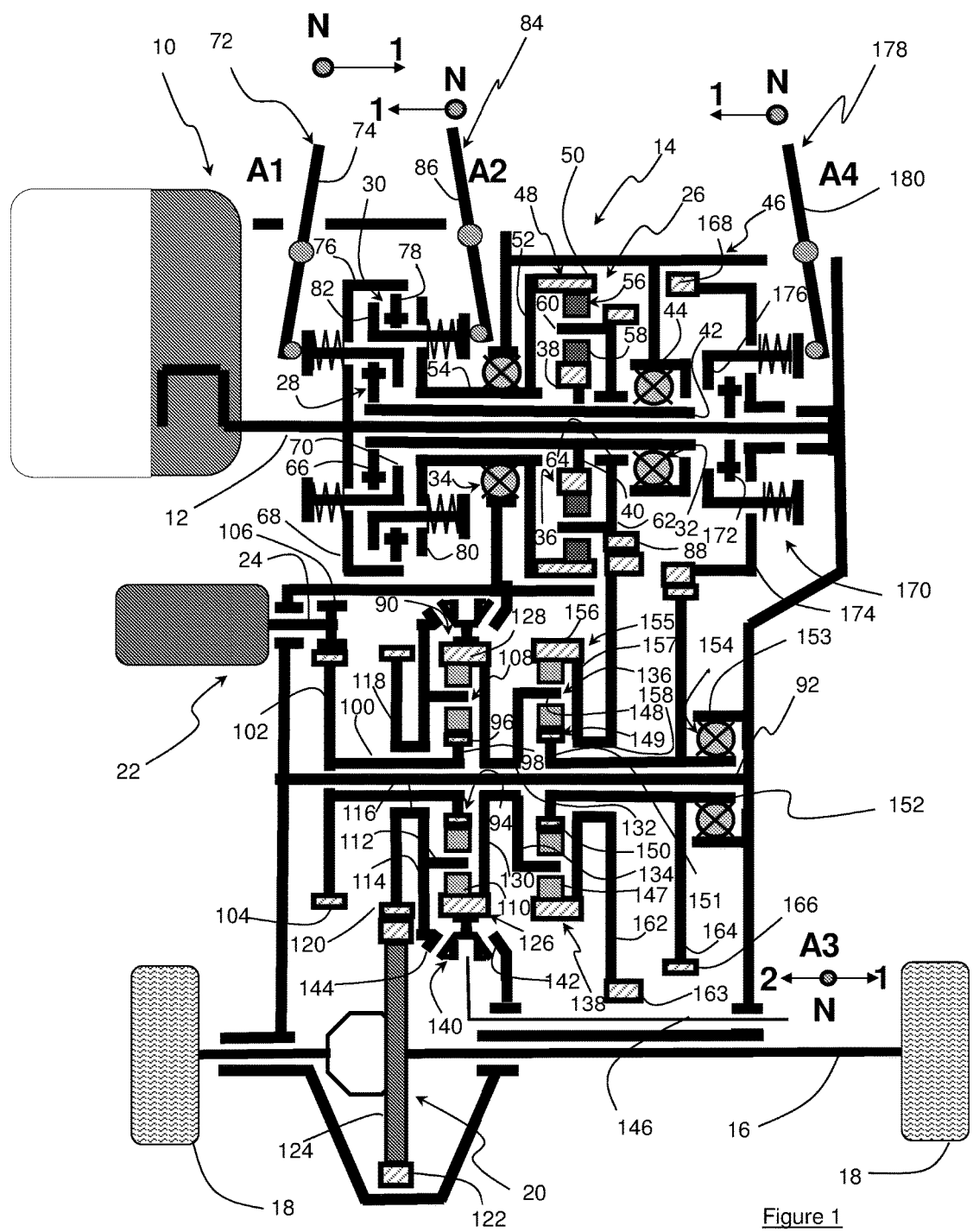
FIG. 1 is a diagram showing a powertrain according to the invention applied to a hybrid vehicle.

In FIG. 1, the powertrain comprises a thermal engine 10, notably an internal-combustion engine, with an engine shaft 12, coming from the crankshaft of the engine, and a speed variation device 14. The powertrain is connected to a drive axle 16 allowing driving wheels 18 of the vehicle, advantageously through a differential bridge 20.

The use of the powertrain for a hybrid vehicle includes a driving and receiving machine 22 associated therewith.

In the example below, the driving and receiving machine is an electrical machine with a rotor 24 used either as an electrical motor for driving the vehicle wheels or as a receiving machine for generating a electrical current, notably for recharging the batteries.

Of course, any other type of driving and receiving machine, such as a hydraulic or pneumatic machine, can be used.

Speed variation device 14 comprises a main epicyclic gear train 26, which is referred to as thermal engine epicyclic gear train, with two controlled couplings 28 and 30, here in the form of disc clutches, and two one-way automatic couplings, such as free wheels 32 and 34.

More precisely, engine epicyclic gear train 26 comprises a sun gear 36 with an externally toothed wheel 38 carried by a flange 40. The flange is fixedly mounted on a tubular shaft 42, which is referred to as sun gear shaft, which surrounds engine shaft 12 to be free in rotation but is fixed in axial translation with respect thereto. The shaft 12 rests against a bearing 44 carried by a fixed part 46 of the vehicle powertrain, such as the housing of the powertrain, through one-way coupling 32, which is referred to as a sun gear free wheel.

Gear train 26 also comprises a crown 48 with an internally toothed wheel 50 arranged concentrical to the sun gear. A connecting web 52 is linked to a tubular shaft 54, which is referred to as crown shaft, and surrounds the sun gear tubular shaft 42 while being free in rotation, but fixed in translation with respect thereto. Crown 48 is externally connected to fixed part 46 of the vehicle powertrain by one-way coupling 34, which is referred to as crown free wheel.

The two free wheels 32 and 34 are arranged in such a way that crown 48 and sun gear 36 can rotate only in the same direction, and preferably in the same direction as engine shaft 12.

The engine epicyclic gear train comprises a planet gear carrier 56 which advantageously has three planet gears 58 in form of externally toothed wheels, arranged in the same angular interval with respect to one another (120° here) and meshes with the crown and the sun gear.

Crown wheel 50, sun gear wheel 38 and planet gears 58 are therefore arranged in the same plane, which here is in a vertical plane relative to FIG. 1.

These planet gears 58 are each carried by a horizontal pin 60 and are free to rotate, but fixed to not translate thereon. These planet gear pins are connected to a vertical wall 62 linked to a tubular shaft 64, which is referred to as planet gear carrier shaft, and which surrounds sun gear shaft 42 while being free to rotate thereon.

The free ends of the sun gear and crown shafts each carry a controlled coupling 28 and 30, which preferably is a friction disc clutch.

Thus, clutch 28, which is referred to as sun gear clutch, comprises a friction disc 66, fixed to not rotate but is free to translate axially on the sun gear shaft 42. The friction disc is intended to be clamped between a reaction plate 68 mounted fixed to not rotate and is free to not rotate on engine shaft 12. A pressure plate 70, is free to translate axially with respect to this pressure plate while being fixed to not rotate therewith. The axial motion of the pressure plate is controlled by a clutch actuator 72 (actuator A1), which here is in the form of a lever 74 that pivots on a fixed point of the powertrain, between a clutch while in a disengaged position (position N) and a clutch while in an engaged position (position 1).

Pressure plate 68 is extended, on the external periphery thereof, by a horizontal wall 76 that carries another friction disc 78 which is fixed not to rotate and is free to translate axially, and is coaxial with friction disc 66 and is part of the other clutch 30, which is referred to as crown clutch.

Friction disc 66 is designed to be clamped between a reaction plate 80, which is mounted to not translate axially and is free to rotate on the free end of crown shaft 54. A pressure plate 82 is free to translate axially through the action of another clutch actuator 84 (actuator A2). As mentioned above, the actuator comes is a lever 86 that pivots on a fixed point of the powertrain between a clutch disengaged position (position N) and a clutch engaged position (position 1).

As is better illustrated in FIG. 1, vertical wall 62 of planet gear carrier 56 carries an externally toothed horizontal wheel 88 whose purpose is explained in the description below.

As is more visible in FIG. 1, the speed variation device comprises another epicyclic gear train 90, which is referred to as machine epicyclic gear train. The machine epicyclic gear train 90 is arranged on a shaft 92, which is referred to as machine shaft, and is substantially parallel to shaft 12 and fixedly to fixed part 46 of the powertrain.

The gear train 90 comprises a sun gear 94 including an externally toothed wheel 96 carried by a flange 98. The flange 98 is fixed to a tubular shaft 100, referred to as machine sun gear shaft that surrounds, machine shaft 92 and is free to rotate thereon but which is fixed to not translate axially on machine shaft 92. This sun gear shaft 100 carries, at the free end thereof, a web 102 provided, on the periphery thereof, having an externally toothed wheel 104. The wheel cooperates with a toothed wheel 106 which is carried by rotor 24 of machine 22.

Sun gear 94 cooperates with a planet gear carrier 108 and has advantageously three planet gears 110, in form of externally toothed wheels, arranged on planet gear pins 112 carried by a web 114 carried by a tubular planet gear carrier shaft 116 which surrounds the sun gear shaft 100 and are arranged in at an equal angular interval with respect to one another (120° here). The planet gear carrier shaft carries, at the free end thereof, a web 118 provided on the periphery thereof with an externally toothed wheel 120. Wheel 120 cooperates with toothed wheel 122 and is connected to drive axle 16 by a web 124.

The assembly of two toothed wheels forms a motion transmission track between machine epicyclic gear train 90 and axle 16.

Planet gears 110 cooperate by meshing with a crown 126 that comprises an internally toothed wheel 128 carried by a web 130 connected to a tubular crown shaft 132. Shaft 132 surrounds machine shaft 92 and comprises a web 134 of a planet gear carrier 136 that is part of an additional epicyclic gear train 138 mounted on machine shaft 92 while being concentric relative to the machine epicyclic gear train 90.

Crown 126 of epicyclic gear train 90 also carries a controlled coupling 140 (actuator A3), which here is a double-acting synchromesh.

By way of example only, this coupling comprises a synchromesh with two meshing positions (1, 2) and one neutral position (N). The synchromesh is fixedly carried to not rotate on the outer wall of wheel 128 of crown 126 but is free to translate axially thereon. The synchromesh cooperates with either a fixed coupling surface 142 carried by a fixed part 46 of the powertrain, or with another coupling surface 144 carried by the peripheral end of web 114 of machine planet gear carrier 108.

The synchromesh is therefore driven by a control which provides a coupling with the fixed part of the powertrain (position 1), with the planet gear carrier (position 2), or a neutral position without connection with any of the two coupling surfaces.

Planet gear carrier 136 of additional epicyclic gear train 138 comprises three planet gears 147, in form of externally toothed wheels, arranged on planet gear pins 148 carried by web 134 and spaced in an equal angular interval with respect to one another (120° here).

Planet gears 148 cooperate with a sun gear 149 comprising an externally toothed wheel 150 carried by a flange 151. The flange 151 is fixedly mounted on a tubular shaft 152, which is referred to as additional sun gear shaft, and surrounds machine shaft 92, to be free to rotate thereon but is fixed to not translate thereon. The free end of this sun gear shaft is carried by a bearing 153 through a one-way automatic coupling such as a free wheel 154.

Planet gears 147 also cooperate with a crown 155 which comprises an externally toothed wheel 156 carried by a flange 157. The flange 157 surrounds and is fixed to a tubular sun gear shaft 152, which is referred to as additional crown shaft, and is free to rotate. The free end of the additional crown shaft 152 carries a web 162 provided, at the end thereof, with the toothed wheel 163 that cooperates with toothed wheel 88 carried by the planet gear carrier of engine epicyclic gear train 26.

The additional sun gear shaft carries, between toothed wheel 150 and its free end, a web 164 provided on the periphery thereof, with an externally toothed machine wheel 166 cooperates with an engine toothed wheel 168 carried by shaft 12. Here shaft 12 is connected to a controlled coupling 170 in the form of a disc clutch.

When clutch 170 is in a disengaged position and at least one of the two clutches 28 or 30 is in an engaged position, free wheel 154 allows additional sun gear shaft 152 to be blocked.

This clutch comprises a friction disc 172 which is fixedly carried by engine shaft 12. The friction disc 172 is intended to be clamped between a reaction plate 174, which is mounted to be free to rotate and in translation on engine shaft 12 and carries an engine toothed wheel 168 and a pressure plate 176, which are free to translate axially with respect to this pressure plate while being fixed to not rotate thereon. Axial motion of the pressure plate is controlled by a clutch actuator 178 (actuator A4), which is here in the form of a lever 180 which pivots on a fixed point of the powertrain between a clutch disengaged position (position N) and an engaged position (position 1).

The various gear ratio configurations are now detailed in the table below.

| | Actuator | | | | |
|---|---|---|---|---|---|
| | A1 | A2 | A3 | A4 | Gear ratio |
| Position | N | N | 2 | N | 0 |
| | N | N | 2 | 1 | 1 |
| | 1 | N | 2 | N | 2 |
| | 1 | N | 2 | 1 | 3 |
| | N | 1 | 2 | N | 4 |

-continued

| Actuator | | | | |
|---|---|---|---|---|
| A1 | A2 | A3 | A4 | Gear ratio |
| N | 1 | 2 | 1 | 5 |
| 1 | 1 | 2 | N | 6 |
| 1 | 1 | 2 | 1 | 7 |

When machine 22 is not blocked, the transmission can be used as a parallel hybrid transmission, allowing the machine to be used in either in driving or in a generator mode.

The 7 e-CVT modes (driving mode of machine 22) are available when actuator A3 is in neutral position.

The first pure electrical mode is obtained when actuator A3 is in position 1. The vehicle can then be run in forward and in reverse gear.

The second pure electrical mode is obtained when actuator A3 is in position 2 and at least one of the three clutches 28, 30 and 170 is in a disengaged position. In this mode, only the forward gear is available.

Figure 2:
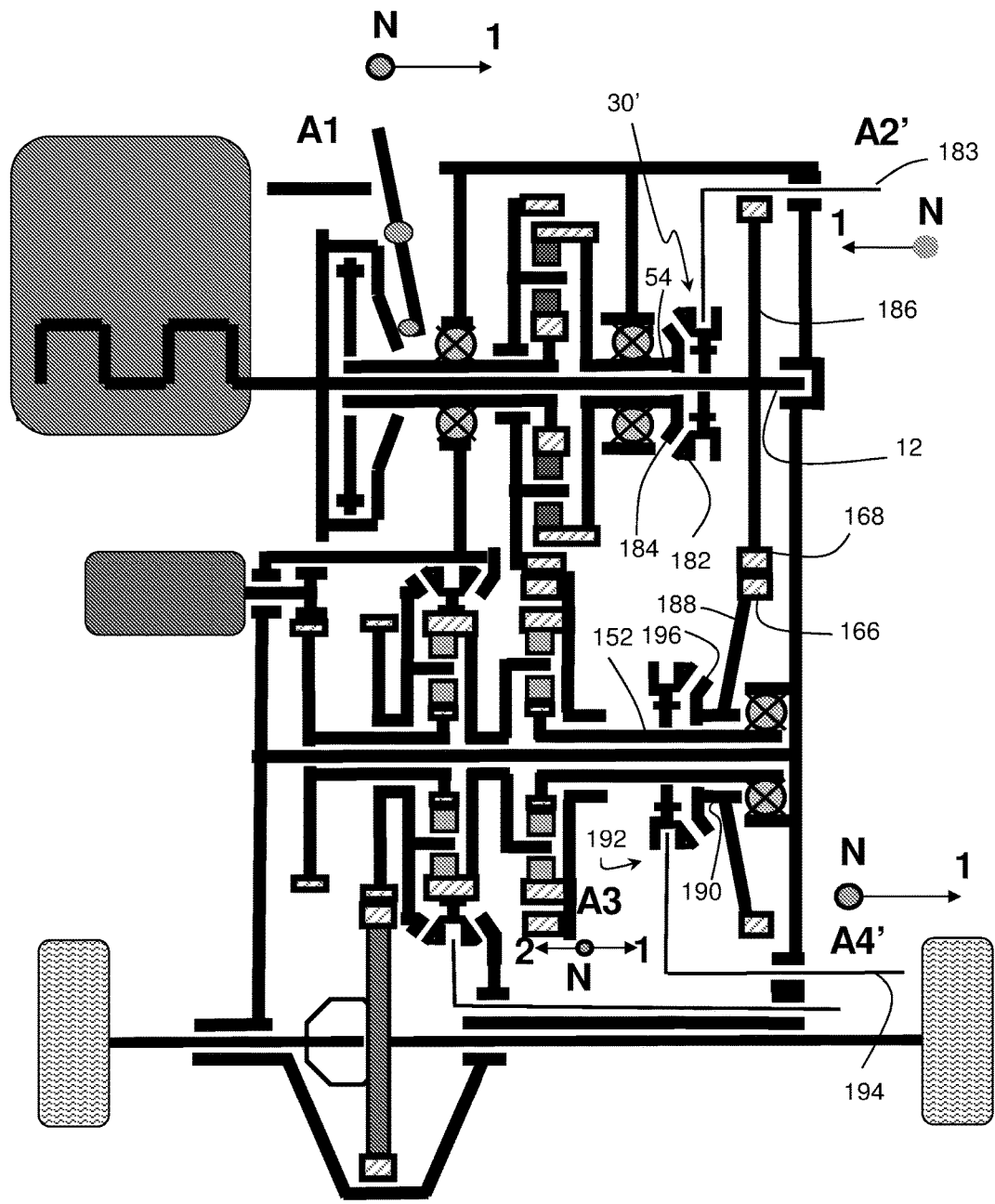
FIGS. 2 to 7 diagrammatically illustrate variants of the powertrain of FIG. 1.

The variant of FIG. 2 differs from FIG. 1 in that disc clutch 30 of crown 48, as shown in FIG. 1, has been replaced with a controlled coupling 30' in the form of a single-acting synchromesh 182 (actuator A2'). The synchromesh 182 is fixed to not rotate on engine shaft 12 but is axially movable under the action of a control 183 for shifting from a neutral position (position N) to an active position (position 1). In position 1 the synchromesh 182 is rotatably connected to a linking face 184 carried by tubular crown shaft 54.

Furthermore, engine toothed wheel 168 is, in this variant, carried by a fixed web 186 carried by engine shaft 12.

Machine toothed wheel 166, which cooperates with engine toothed wheel 168 is carried by a web 188 mounted on a tubular shaft 190, which surrounds the tubular sun gear shaft 152.

The connection between the two tubular shafts is provided by a single-acting controlled coupling 192 (actuator A4') that is arranged on tubular sun gear shaft 152 of the additional epicyclic gear train while being fixed to not rotate but is free to translate axially, and is subjected to control by control 194. The control 194 allows the synchromesh 182 to be shifted from a neutral position (position N) to an active position (position 1) where the synchromesh is rotatably connected to a linking face 196 carried by tubular shaft 190.

The operation of this variant, whether in electrical or thermal traction/propulsion mode, is identical to the one of FIG. 1, as shown in the table below.

| | Actuator | | | | |
|---|---|---|---|---|---|
| | A1 | A2' | A3 | A4' | Gear ratio |
| Position | N | N | 2 | N | 0 |
| | N | N | 2 | 1 | 1 |
| | 1 | N | 2 | N | 2 |
| | 1 | N | 2 | 1 | 3 |
| | N | 1 | 2 | N | 4 |
| | N | 1 | 2 | 1 | 5 |
| | 1 | 1 | 2 | N | 6 |
| | 1 | 1 | 2 | 1 | 7 |

The 7 parallel hybrid gear ratios are identical to the 7 pure thermal gear ratios described in the previous table. Whatever the gear ratio that is selected, electrical machine 22 is rotating, and can therefore be used in driving or generator mode.

The 7 e-CVT modes are available when actuator A3 is in neutral position, and the positions of actuators A1, A2' and A4' remain identical to those of the previous table.

The first pure electrical mode is obtained when actuator A3 is in position 1. The vehicle can then be run in forward and in reverse gear.

The second pure electrical mode is obtained when actuator A3 is in position 2 and at least one of clutches 28, 30' and 192 is in disengaged position. In this mode, only the forward gear is available.

Figure 3:
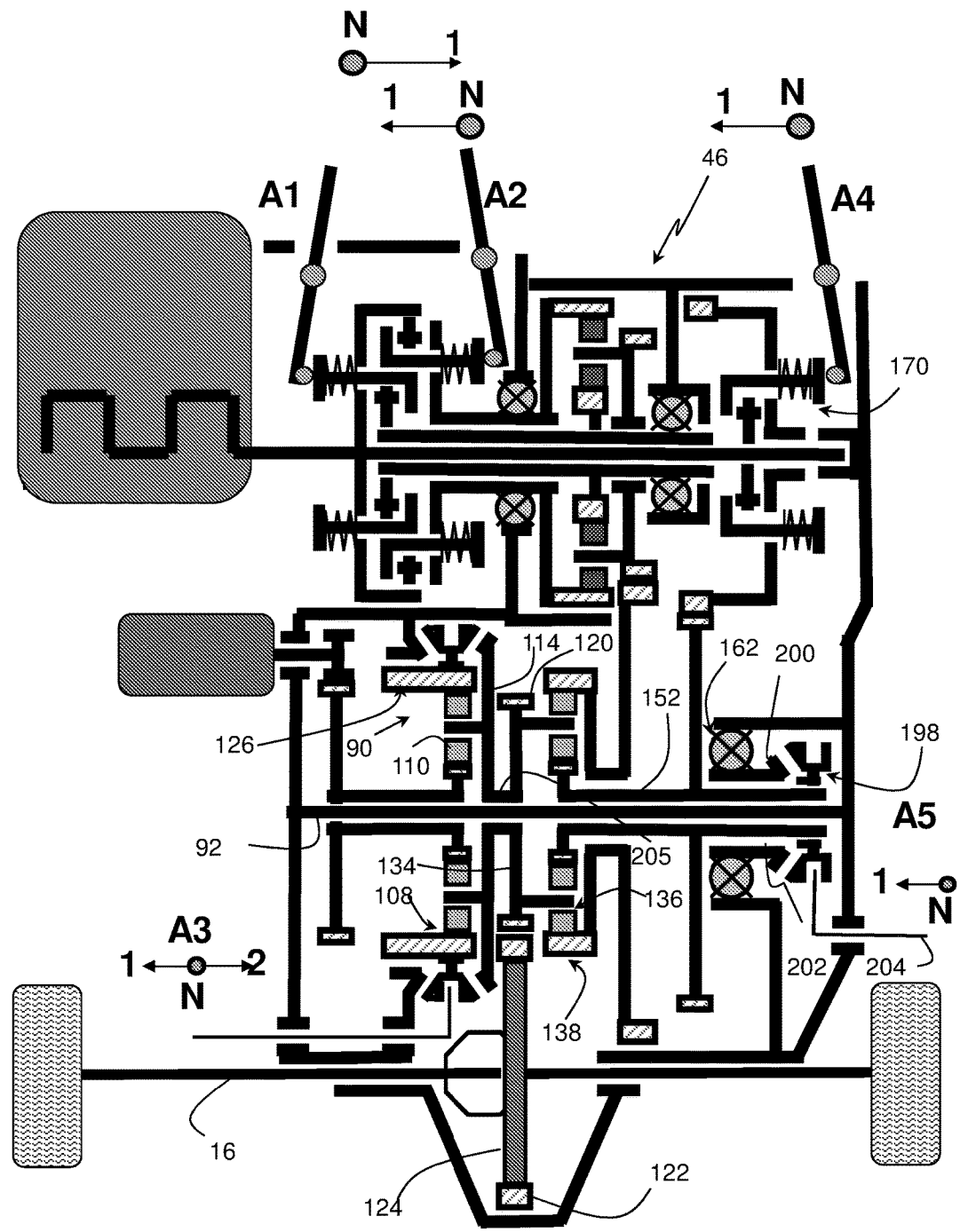

The variant of FIG. 3 differs from FIG. 1 in that tubular sun gear shaft 152 of additional epicyclic gear train 138 carries, in the end area thereof, a controlled coupling 198 (actuator A5), which here is in the form of a single-acting synchromesh.

This synchromesh 198 is mounted to not rotate but is free to axially translate on tubular shaft 152 to cooperate with a bearing flank 200 carried by a tubular sleeve 202. Sleeve 202 surrounds sun gear shaft 152 and it is connected to fixed part 46 of the powertrain by free wheel 162 of FIG. 1.

When synchromesh 198 and sleeve 202 mesh, the free wheel performs the some function as the first embodiments. It is blocked on fixed part 46 when at least one of clutches 28 and 30 is in engaged position and clutch 170 is in disengaged position. This situation occurs for three of the seven gear ratios.

This synchromesh 198 is driven by a control 204 enabling achieving coupling with flank 200 of sleeve 202 (position 1) or a neutral position without connection with any one of the coupling surfaces (position N).

Furthermore, the two epicyclic gear trains 90 and 138 carried by machine shaft 92 face each other so that webs 114 and 134 of planet gear carriers 108 and 136 are carried by the same tubular shaft 205 that surrounds machine shaft 92. As is more visible in the figure, web 134 of planet gear carrier 136 carries toothed wheel 120 that meshes with toothed wheel 122 carried by web 124 connected to axle 16.

Moreover, crown 126 of machine epicyclic train 90 is carried by the external periphery thereof on a fixed part 46 of the powertrain while meshing with planet gears 110.

The various gear ratio configurations are now detailed in the table below.

|  | Actuator | | | | | |
| --- | --- | --- | --- | --- | --- | --- |
|  | A1 | A2 | A3 | A4 | A5 | Gear ratio |
| Position | N | N | 1/N/2 | N | 1/N | 0 |
|  | N | N | 1/N/2 | 1 | 1/N | 1 |
|  | 1 | N | 1/N/2 | N | 1 | 2 |
|  | 1 | N | 1/N/2 | 1 | 1/N | 3 |
|  | N | 1 | 1/N/2 | N | 1 | 4 |
|  | N | 1 | 1/N/2 | 1 | 1/N | 5 |
|  | 1 | 1 | 1/N/2 | N | 1 | 6 |
|  | 1 | 1 | 1/N/2 | 1 | 1/N | 7 |

When one of the 7 pure thermal gear ratios described in the previous table is used, operation in parallel hybrid mode can be obtained according to the position of actuator A3. When actuator A3 is in neutral position, the parallel hybrid mode is not available, making it possible not to drive the electrical machine with no load. When actuator A3 is in positions 1 and 7 parallel hybrid modes are available by associating one of the 7 thermal gear ratios with the short electrical gear ratio of machine 22. When actuator A3 is in positions 2 and 7 additional parallel hybrid modes are available by associating one of the 7 thermal gear ratios with the high electrical gear ratio of machine 22.

The first pure electrical mode is obtained when actuator A3 is in position 1 and at least one of the three clutches 28, 30 and 170 is in disengaged position. In this mode, the vehicle can be run in reverse gear if actuator A5 is in position N and actuator A4 is in disengaged position.

The second pure electrical mode is obtained when actuator A3 is in position 2 and at least one of the three clutches 28, 30 and 170 is in disengaged position. In this mode, the vehicle can be run in reverse gear if actuator A5 is in position N and actuator A4 is in disengaged position.

Figure 4:
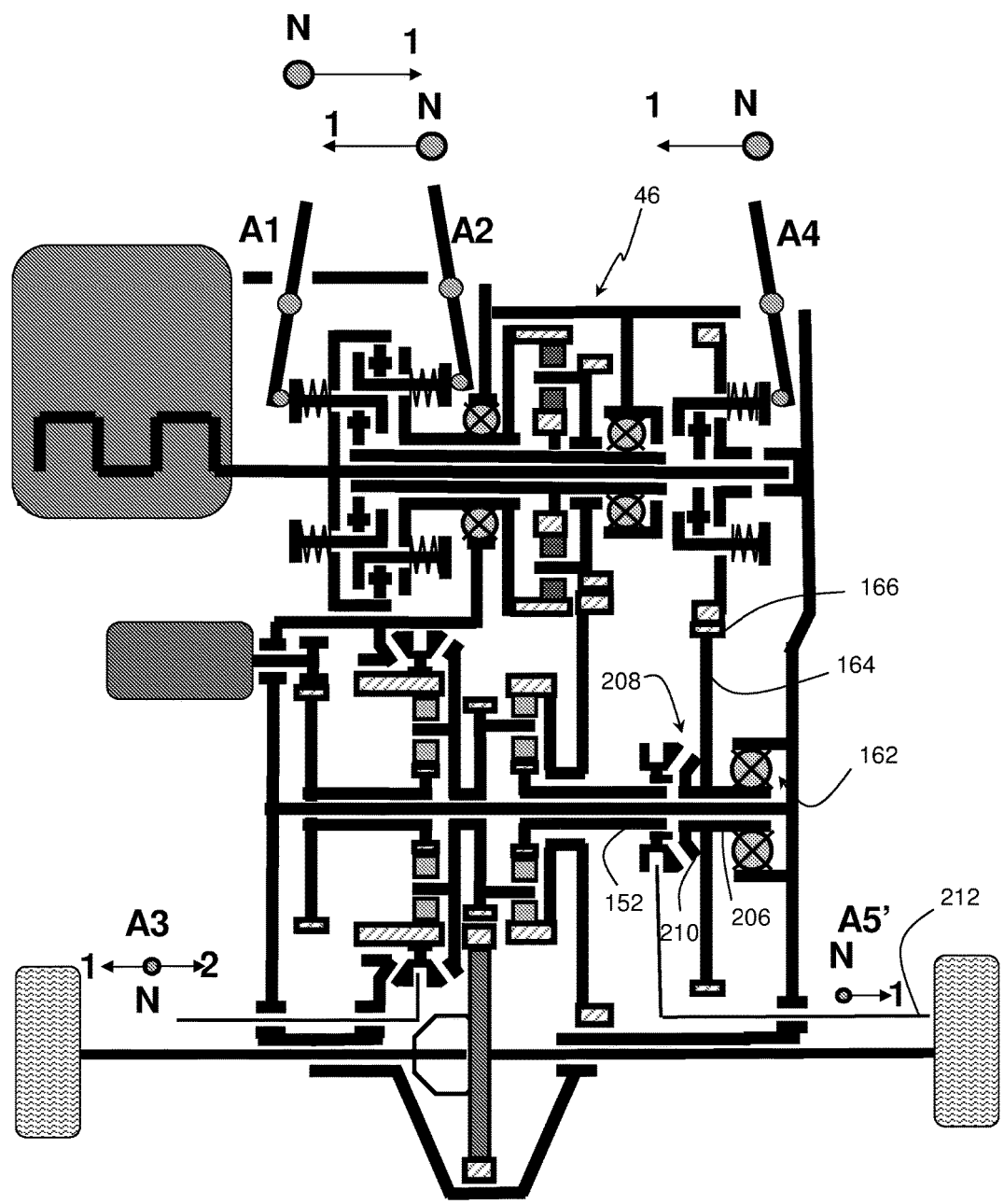

In the variant of FIG. 4, which is very close to that of FIG. 3, web 164 and its machine toothed wheel 166 are mounted on a tubular sleeve 206 surrounding the machine shaft and connected to fixed part 46 of the powertrain by free wheel 162.

Tubular sun gear shaft 152 of the additional epicyclic gear train carries, opposite tubular sleeve 206, a controlled coupling 208 (actuator A5') in form of a single-acting synchromesh.

This synchromesh is mounted to not rotate but is free to axially translate on tubular shaft 152 so as to cooperate with a bearing flank 210 carried by tubular sleeve 206. The synchromesh is controlled by a control 212 enabling it to achieve coupling with flank 210 of sleeve 206 (position 1) or to be in neutral position without connection with any one of the coupling surfaces (position N).

The various gear ratio configurations are now detailed in the table hereafter.

|  | Actuator | | | | | |
| --- | --- | --- | --- | --- | --- | --- |
|  | A1 | A2 | A3 | A4 | A5' | Gear ratio |
| Position | N | N | 1/N/2 | N | 1/N | 0 |
|  | N | N | 1/N/2 | 1 | 1 | 1 |
|  | 1 | N | 1/N/2 | N | 1 | 2 |
|  | 1 | N | 1/N/2 | 1 | 1 | 3 |
|  | N | 1 | 1/N/2 | N | 1 | 4 |
|  | N | 1 | 1/N/2 | 1 | 1 | 5 |
|  | 1 | 1 | 1/N/2 | N | 1 | 6 |
|  | 1 | 1 | 1/N/2 | 1 | 1 | 7 |

When one of the 7 pure thermal gear ratios described in the previous table is used, operation in parallel hybrid mode can be obtained according to the position of actuator A3.

When actuator A3 is in neutral position, the parallel hybrid mode is not available which makes it impossible to drive the electrical machine without a load.

When actuator A3 is in positions 1 and 7 parallel hybrid modes are available by associating one of the 7 thermal gear ratios with the short electric gear ratio of machine 22.

When actuator A3 is in position 2, 7 additional parallel hybrid modes are available by associating one of the 7 thermal gear ratios with the long electric gear ratio of machine 22.

The first pure electrical mode is obtained when actuator A3 is in position 1 and actuator A5' is in position N. In this mode, the forward gear and the reverse gear are available.

The second pure electrical mode is obtained when actuator A3 is in position 2 and actuator A5' is in position N. In this mode, the forward gear and the reverse gear are available.

Figure 5:
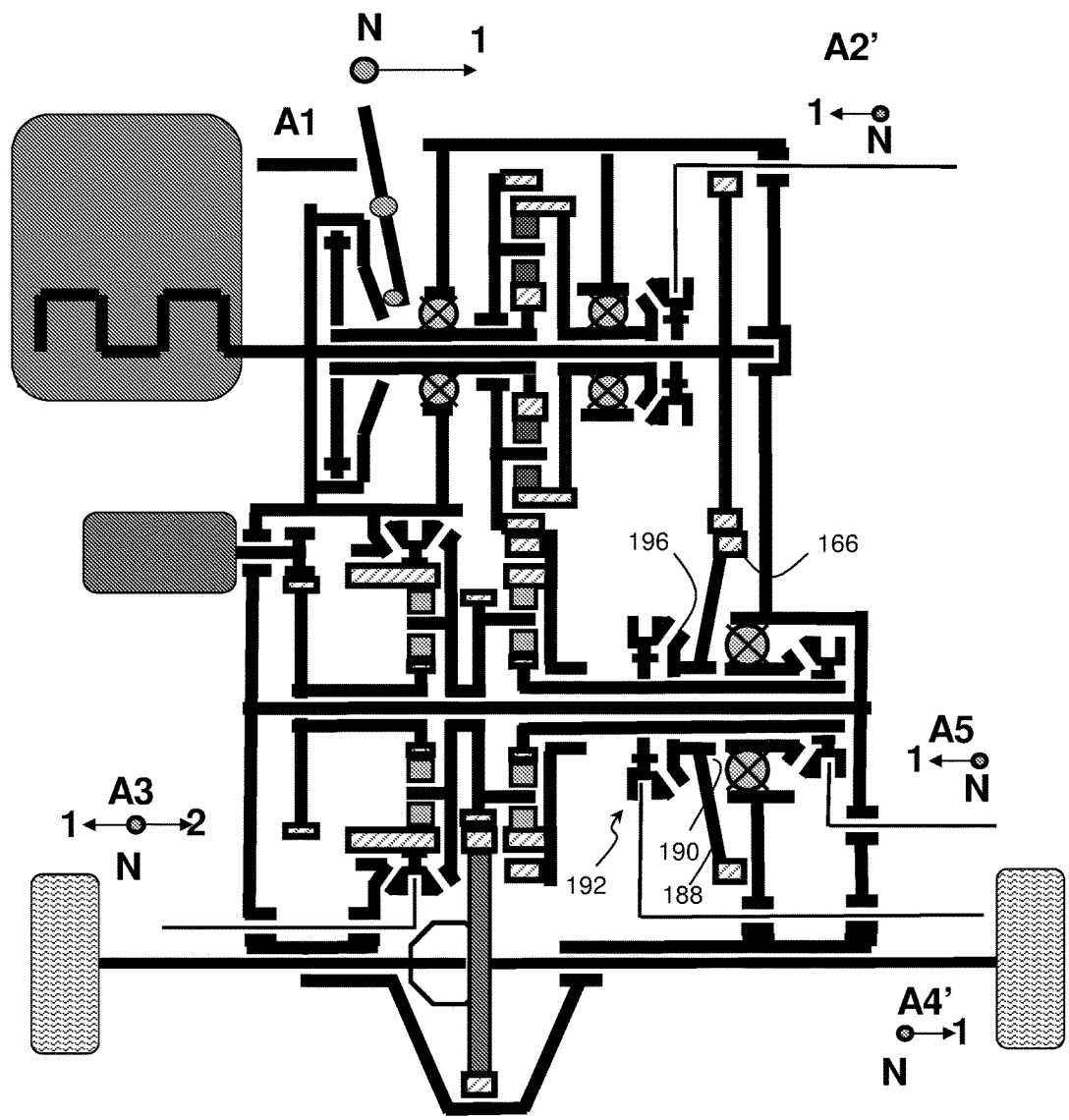

The variant of FIG. 5 is close to the variant of FIG. 3. The difference is that web 164 and toothed wheel 166 of FIG. 3 are replaced by controlled coupling 192 (actuator A4') of FIG. 2 and tubular sleeve 190 with its flank 196 carrying web 188 and machine toothed wheel 166.

The various gear ratio configurations are now detailed in the table below.

| | | Actuator | | | | |
|---|---|---|---|---|---|---|
| | A1 | A2' | A3 | A4' | A5 | Gear ratio |
| Position | N | N | 1/N/2 | N | 1/N | 0 |
| | N | N | 1/N/2 | 1 | 1/N | 1 |
| | 1 | N | 1/N/2 | N | 1 | 2 |
| | 1 | N | 1/N/2 | 1 | 1/N | 3 |
| | N | 1 | 1/N/2 | N | 1 | 4 |
| | N | 1 | 1/N/2 | 1 | 1/N | 5 |
| | 1 | 1 | 1/N/2 | N | 1 | 6 |
| | 1 | 1 | 1/N/2 | 1 | 1/N | 7 |

When one of the 7 pure thermal gear ratios described in the previous table is used, operation in parallel hybrid mode can be obtained according to the position of actuator A3.

When actuator A3 is in neutral position, the parallel hybrid mode is not available, it is impossible to drive the electrical machine with no load.

When actuator A3 is in positions 1 and 7 parallel hybrid modes are available by associating one of the 7 thermal gear ratios with the low electrical gear ratio of machine 22.

When actuator A3 is in positions 2 and 7 additional parallel hybrid modes are available by associating one of the 7 thermal gear ratios with the high electrical gear ratio of machine 22.

The first pure electrical mode is obtained when actuator A3 is in position 1 and at least one of the three coupling systems 28 and 30' and 192 is in disengaged position. In this mode, the vehicle can be run in reverse gear if actuators A5 and A4' ore in position N.

The second pure electrical mode is obtained when actuator A3 is in position 2 and at least one of the three coupling systems 28 and 30' and 192 is in disengaged position. In this mode, the vehicle can be run in reverse gear if actuators A5 and A4' are in position N.

Figure 6:
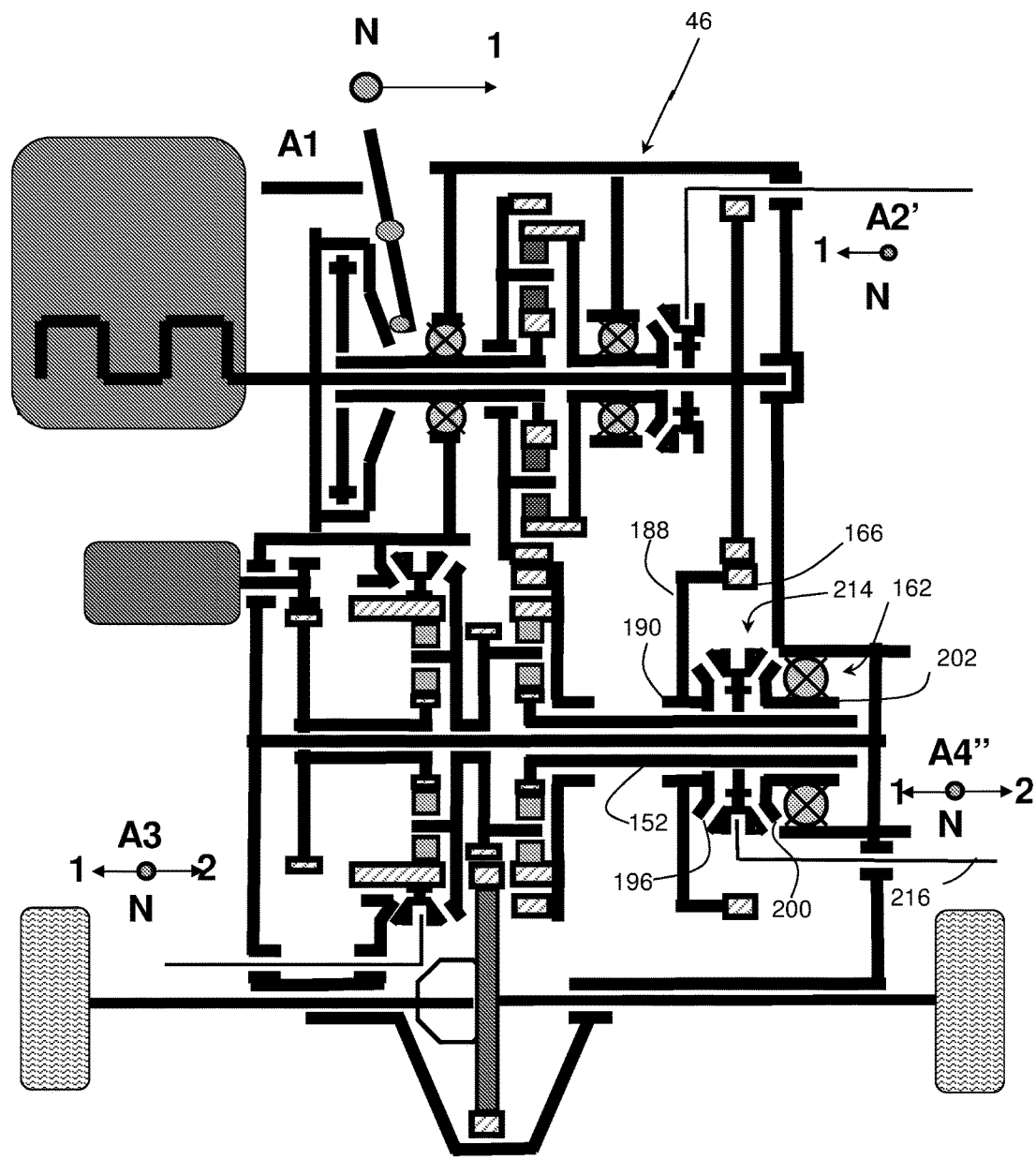

FIG. 6 is a variant of FIG. 5 with the grouping together into a single controlled coupling 214 (actuator A4") in FIG. 6 of controlled couplings 192 (actuator A4') and 198 (actuator A5) of FIG. 5.

This coupling 214 comprises a double-acting synchromesh allowing connection of tubular shaft 152 either to tubular shaft 190 carrying web 188 which is provided with machine toothed wheel 166 or to tubular sleeve 202 carried by fixed part 46 of the powertrain through free wheel 162.

Thus, the coupling comprises a synchromesh with two meshing positions 1 and 2) and one neutral position (N). This synchromesh is carried fixedly in rotation by tubular sun gear shaft 152 while being freely axially translatable thereon. This synchromesh cooperates with either with fixed coupling surface 196 carried by tubular shaft 190 or with coupling surface 200 carried by tubular sleeve 202.

The synchromesh is therefore controlled by a control 216 enabling achieving coupling with tubular shaft 190 (position 1), with tubular sleeve 202 (position 2) or in neutral position without connection with any one of the two coupling surfaces.

The various gear ratio configurations are now detailed in the table hereafter.

| | | Actuator | | | |
|---|---|---|---|---|---|
| | A1 | A2' | A3 | A4" | Gear ratio |
| Position | N | N | 1/N/2 | 2 | 0 |
| | N | N | 1/N/2 | 1 | 1 |
| | 1 | N | 1/N/2 | 2 | 2 |
| | 1 | N | 1/N/2 | 1 | 3 |
| | N | 1 | 1/N/2 | 2 | 4 |
| | N | 1 | 1/N/2 | 1 | 5 |
| | 1 | 1 | 1/N/2 | 2 | 6 |
| | 1 | 1 | 1/N/2 | 1 | 7 |

When one of the 7 pure thermal gear ratios described in the previous table is used, operation in parallel hybrid mode can be obtained according to the position of actuator A3.

When actuator A3 is in neutral position, the parallel hybrid mode is not available, making it impossible to drive the electrical machine without a load.

When actuator A3 is in positions 1 and 7 parallel hybrid modes are available by associating one of the 7 thermal gear ratios with the short electrical gear ratio of machine 22.

When actuator A3 is in positions 2 and 7 additional parallel hybrid modes are available by associating one of the 7 thermal gear ratios with the high electrical gear ratio of machine 22.

The first pure electrical mode is obtained when actuator A3 is in position 1 and actuator A4" is in position N. In this mode, the forward gear and the reverse gear are available.

The second pure electrical mode is obtained when actuator A3 is in position 2 and actuator A4" is in position N. In this mode, the forward gear and the reverse gear are available.

Figure 7:
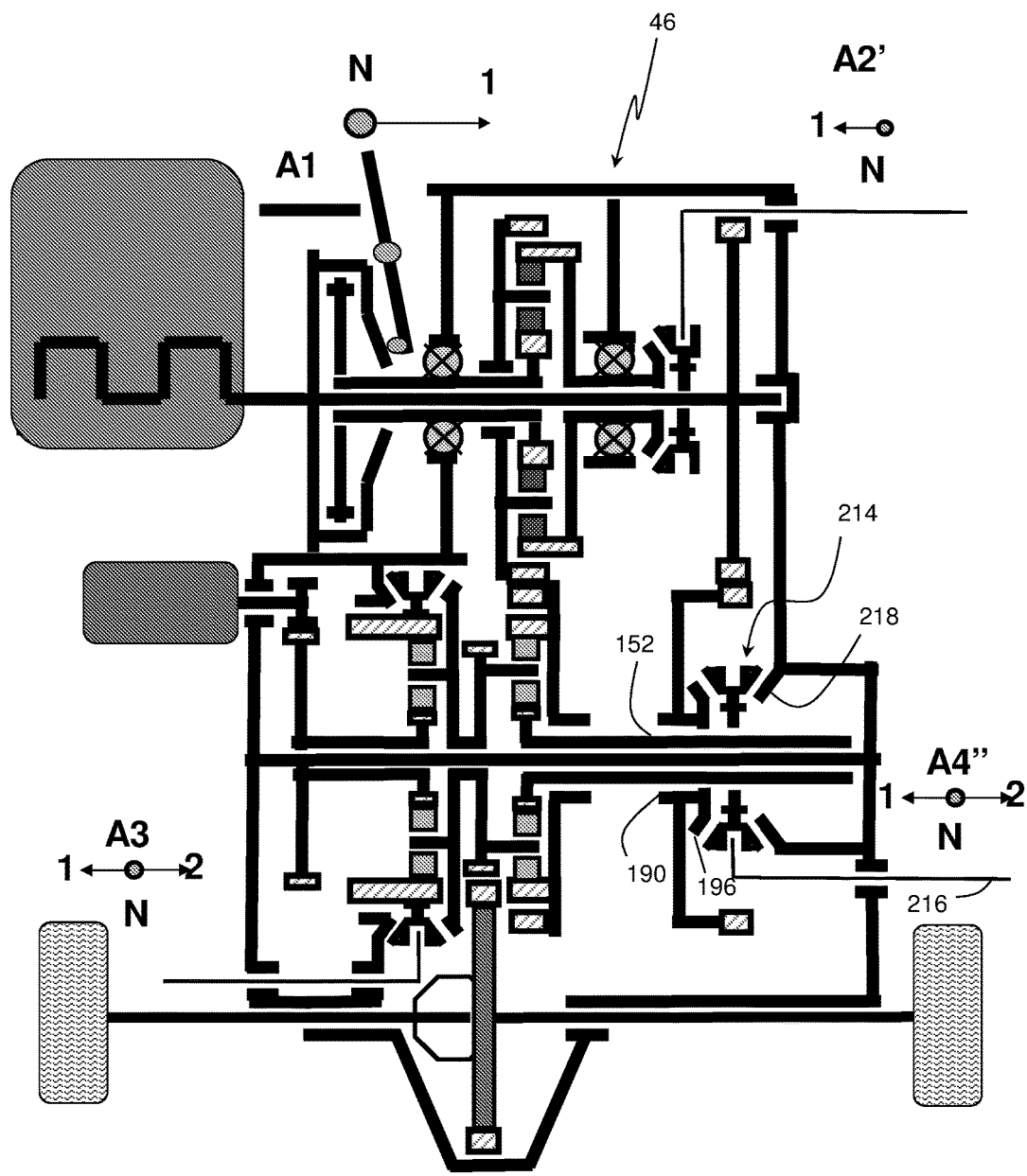

FIG. 7 is a variant of FIG. 6 where tubular sleeve 202 and free wheel 162 of FIG. 6 have been removed and replaced with a coupling surface 218 carried by a fixed part 46 of the powertrain.

Thus, synchromesh 214 can have two meshing positions (1 and 2) and one neutral position (N). This synchromesh is fixedly in rotation by tubular sun gear shaft 152 while being mobile in axial translation thereon.

Synchromesh 214 is controlled by a control 216 enabling achieving coupling with coupling surface 196 carried by tubular shaft 190 (position 1), or with coupling surface 218 carried by fixed part 46 (position 2) or to be in neutral position (position N) without connection with any one of the two coupling surfaces.

The various gear ratio configurations are now detailed in the table below.

| | | Actuator | | | |
|---|---|---|---|---|---|
| | A1 | A2' | A3 | A4" | Gear ratio |
| Position | N | N | 1/N/2 | 2 | 0 |
| | N | N | 1/N/2 | 1 | 1 |
| | 1 | N | 1/N/2 | 2 | 2 |
| | 1 | N | 1/N/2 | 1 | 3 |
| | N | 1 | 1/N/2 | 2 | 4 |
| | N | 1 | 1/N/2 | 1 | 5 |
| | 1 | 1 | 1/N/2 | 2 | 6 |
| | 1 | 1 | 1/N/2 | 1 | 7 |

When one of the 7 pure thermal gear ratios described in the previous table is used, operation in parallel hybrid mode can be obtained according to the position of actuator A3.

When actuator A3 is in neutral position, the parallel hybrid mode is not available, making it possible not to drive the electrical machine with no load.

When actuator A3 is in positions 1 and 7 parallel hybrid modes are available by associating one of the 7 thermal gear ratios with the short electrical gear ratio of machine 22.

When actuator A3 is in positions 2 and 7 additional parallel hybrid modes are available by associating one of the 7 thermal gear ratios with the high electrical gear ratio of machine 22.

The first pure electrical mode is obtained when actuator A3 is in position 1 and actuator A4" is in position N. In this mode, the forward gear and the reverse gear are available.

The second pure electrical mode is obtained when actuator A3 is in position 2 and actuator A4" is in position N. In this mode, the forward gear and the reverse gear are available.

The invention claimed is:

1. A powertrain for an automotive vehicle comprising:
a thermal engine, a speed variation device including an engine epicyclic gear train with a sun gear and a crown which are each connected to shaft of the thermal engine by a controlled coupling and to a fixed part of the vehicle by a one-way automatic coupling, a machine epicyclic gear train disposed on a machine shaft substantially parallel to the shaft of the thermal engine and to the connecting engine epicyclic gear train to a track for motion transmission to a drive axle and wherein;
the machine epicyclic gear train comprises a sun gear carried by a sun gear shaft, a crown and a planet gear carrier, and the speed variation device comprises an additional epicyclic gear train and an engine toothed wheel carried by shaft of the thermal engine which connects the shaft of the thermal engine to a machine toothed wheel carried by the additional epicyclic gear train.

2. A powertrain for an automotive vehicle as claimed in claim 1, wherein the additional epicyclic gear train is on the machine shaft.

3. A powertrain for an automotive vehicle as claimed in claim 1, wherein the crown is connected to a planet gear carrier of the additional epicyclic gear train.

4. A powertrain for an automotive vehicle as claimed in claim 2, wherein the crown is connected to a planet gear carrier of the additional epicyclic gear train.

5. A powertrain for an automotive vehicle as claimed in claim 1, wherein the planet gear carrier is connected to a planet gear carrier of the additional epicyclic gear train.

6. A powertrain for an automotive vehicle as claimed in claim 3, wherein the planet gear carrier is connected to a planet gear carrier of the additional epicyclic gear train.

7. A powertrain for an automotive vehicle as claimed in claim 4, wherein the planet gear carrier is connected to a planet gear carrier of the additional epicyclic gear train.

8. A powertrain for an automotive vehicle as claimed in claim 1, wherein the crown of the machine epicyclic gear train is carried by a fixed part of the powertrain.

9. A powertrain for an automotive vehicle as claimed in claim 1, wherein the engine toothed wheel idles on the shaft of the thermal engine and the shaft of the thermal engine carries a controlled coupling for connection between the shaft of the thermal engine and the engine toothed wheel.

10. A powertrain for an automotive vehicle as claimed in claim 9, wherein the controlled coupling comprises a disc clutch.

11. A powertrain for an automotive vehicle as claimed in claim 1, wherein the engine toothed wheel is fixedly on the engine shaft.

12. A powertrain for an automotive vehicle as claimed in claim 1, wherein the additional epicyclic gear train comprises a sun gear carried by a tubular sun gear shaft and the machine toothed wheel is fixedly mounted on the tubular sun gear shaft.

13. A powertrain for an automotive vehicle as claimed in claim 2, wherein the additional epicyclic gear train comprises a sun gear carried by a tubular sun gear shaft and the machine toothed wheel is fixedly mounted on the tubular sun gear shaft.

14. A powertrain for an automotive vehicle as claimed in claim 3, wherein the additional epicyclic gear train comprises a sun gear carried by a tubular sun gear shaft and the machine toothed wheel is fixedly mounted on the tubular sun gear shaft.

15. A powertrain for an automotive vehicle as claimed in claim 5, wherein the additional epicyclic gear train comprises a sun gear carried by a tubular sun gear shaft and the machine toothed wheel is fixedly mounted on the tubular sun gear shaft.

16. A powertrain for an automotive vehicle as claimed in claim 8, wherein the additional epicyclic gear train comprises a sun gear carried by a tubular sun gear shaft and the machine toothed wheel is fixedly mounted on the tubular sun gear shaft.

17. A powertrain for an automotive vehicle as claimed in claim 10, wherein the additional epicyclic gear train comprises a sun gear carried by a tubular sun gear shaft and the machine toothed wheel is fixedly mounted on the tubular sun gear shaft.

18. A powertrain for an automotive vehicle as claimed in claim 11, wherein the additional epicyclic gear train comprises a sun gear carried by a tubular sun gear shaft and the machine toothed wheel is fixedly mounted on the tubular sun gear shaft.

19. A powertrain for an automotive vehicle as claimed in claim 1, wherein the additional epicyclic gear train comprises a sun gear carried by a tubular sun gear shaft, the machine toothed wheel idles on sun gear shaft and the sun gear shaft carries a controlled coupling for providing connection between the sun gear shaft and the machine toothed wheel.

20. A powertrain for an automotive vehicle as claimed in claim 19, wherein the controlled coupling cooperates with a bearing surface carried by the machine toothed wheel.

21. A powertrain for an automotive vehicle as claimed in claim 19, wherein the controlled coupling cooperates with a bearing surface carried by machine toothed wheel or with a bearing surface carried by a fixed part of the powertrain.

22. A powertrain for an automotive vehicle as claimed in claim 1, wherein the tubular sun gear shaft of the additional epicyclic gear train carries a tubular sleeve connected to a fixed part of the vehicle by a one-way automatic coupling and the tubular sun gear shaft carries a controlled coupling for providing connection between the tubular sun gear shaft and the tubular sleeve.

23. A powertrain for an automotive vehicle as claimed in claim 1, comprising a driving machine and generator machine for imparting at least motion to the vehicle.

24. A powertrain for an automotive vehicle as claimed in claim 23, wherein a rotor of the driving machine and the generator machine is connected to a sun gear shaft of the machine epicyclic gear train.

* * * * *